United States Patent [19]

Stad

[11] Patent Number: 5,260,087
[45] Date of Patent: Nov. 9, 1993

[54] FAT AND EGG YOLK SUBSTITUTE FOR USE IN BAKING AND PROCESS FOR USING SUBSTITUTE

[76] Inventor: Charles Stad, 604 18th St., Montebello, Calif. 90640

[21] Appl. No.: 953,529

[22] Filed: Sep. 29, 1992

Related U.S. Application Data

[63] Continuation-in-part of Ser. No. 920,762, Jul. 28, 1992, abandoned.

[51] Int. Cl.$^5$ .................. A23L 1/064; A21D 8/00
[52] U.S. Cl. .................. 426/615; 426/549; 426/553; 426/653
[58] Field of Search ............. 426/615, 653, 549, 553

[56] References Cited

U.S. PATENT DOCUMENTS

| | | | |
|---|---|---|---|
| 3,493,387 | 2/1970 | Swicklik | 426/615 |
| 4,752,495 | 6/1988 | Smith | 426/615 |
| 5,000,974 | 3/1991 | Albersmann | 426/572 |

FOREIGN PATENT DOCUMENTS

| | | | |
|---|---|---|---|
| 1393385 | 5/1988 | U.S.S.R. | 426/615 |

*Primary Examiner*—Jeanette Hunter
*Assistant Examiner*—Mary S. Mims
*Attorney, Agent, or Firm*—Monty Koslover Associates

[57] ABSTRACT

A very low fat baking substitute compound for fat and egg yolks, and the methods recommended for using the compound in the preparation of baked goods. The substitute compound imparts a soft and rich texture to the baked goods as well as preserving taste. In addition to greatly reducing the fat, it completely eliminates the cholesterol content of the baked goods while significantly increasing its shelf life.

6 Claims, No Drawings

FAT AND EGG YOLK SUBSTITUTE FOR USE IN BAKING AND PROCESS FOR USING SUBSTITUTE

This application is a continuation-in-part of application Ser. No. 07/920,762 filed Jul. 28, 1992, abandoned.

BACKGROUND OF THE INVENTION

The present invention relates to compounds and processes used in producing a food product. In particular, it relates to a very low fat compound used in baked items and the processes thereof.

Different types of fats such as butter, oil, margarine and shortening are commonly used in the baking industry. The fats provide a softening effect within baked items such as cakes or cookies, by forming films and emulsions. These films inhibit the gluten-starch interaction, promoting a softer crumb, rather than a rubbery mass. Similarly, whole eggs are used as a binder. The use of the fats and eggs produces desirable taste and sensory qualities in the baked goods which appeal to the average consumer.

However, the fats and egg yolks also contribute much fat and cholesterol to the baked items, which for many consumers is unwanted as part of their diet. It is to this consumer concern, that the present invention is addressed.

SUMMARY OF THE INVENTION

The present invention describes a baking substitute compound for fat and egg yolks, and the processes recommended for using the compound. The substitute compound, marketed under the tradename "Wonderslim", comprises precise proportions by weight of water, dry plums, mono and diglycerides or lecithin and citric acid, and contains almost no fat. The processes describe the optimum way to use the compound in baking cookies and cakes etc.

It is a principal object of this invention to provide a low-fat compound which can be used in baking cookies and cakes as a substitute for fats and egg yolks, while still producing the desired product taste and sensory qualities.

It is a further object of this invention to provide a very low fat compound and a method of using it that will not only produce a tasty and tender baked item, but will also contribute to increased item shelf life.

DETAILED DESCRIPTION OF THE PREFERRED EMBODIMENT

The preferred embodiment of the invention compound is used as a substitute for fats and egg yolks in the baking of cookies, cakes, muffins, brownies and breads etc.

In making the invention compound, a known weight of water is first brought to a boil. To the water is added a mixture comprising known weights of dried plums, vegetable mono and diglycerides or lecithin, and citric acid. The mixture is pureed and allowed to cool. The resulting compound which will be referred to herein as 'Wonderslim', can then be used in baking products.

Extensive experimentation has determined, that the formula for producing the compound Wonderslim has to be extremely precise and well balanced in order to avoid the taste of the plums in the finished product. Also to take advantage of the properties of the mono and diglycerides in producing the desired qualities of softness and texture in the baked goods, while keeping the total fat content of the Wonderslim under 2%.

The preferred composition of the compound Wonderslim by percentage of total weight is:
78.53% Water;
19.31% Dried plums;
2.15% Vegetable mono and diglycerides; and
0.01% Citric acid.

Thus, one kilogram of Wonderslim would comprise 785.3 grams of water, 193.1 grams of dried plums, 21.5 grams of mono and diglycerides, and 0.1 grams of citric acid.

An alternate composition of the compound Wonderslim replaces the mono and diglycerides by Lecithin, and is thus by percentage of total weight:
78.53% Water;
19.31% Dried plums;
2.15% Lecithin; and
0.01% Citric acid.

The compound Wonderslim operates on the baking dough in a different manner from the shortening. Instead of coating the gluten as the fatty acids of the different fats do, Wonderslim tenderizes the dough by reducing the chewy composition of the gluten. The small amount of mono and diglycerides or lecithin creates minute lubrication of the gluten. However, it is not enough to avoid a build up of gluten in the event of overmixing. It is therefore very important, in baking cakes, to mix the Wonderslim to the batter at the lowest possible speed, just until smooth.

In baking cakes, the following applies when using Wonderslim:
a) Use Cake Flour rather than All Purpose Flour.
b) Replace whole eggs in the recipe with egg whites.
c) The quantity of Wonderslim used should be equal or less than the quantity of fat required by the recipe.
d) For leavening, a mixture of an equal quantity of baking soda and baking powder should be used.

The replacement of whole eggs with egg whites removes the cholesterol contributed by the egg yolks to the baked goods, further adding to the advantages of using the invention compound.

The recommended method of preparing baked goods such as cakes, using the Wonderslim compound, comprises the steps of:
a) Beating the egg whites with a quarter teaspoon cream of tartar for each 3 egg whites until very firm; adding half the sugar in the recipe to the egg whites in small portions at a time and beating until very firm, and then putting aside;
b) Mixing the liquid elements of the batter, including Wonderslim, at high velocity;
Mixing the liquid into the solid elements of the batter at the lowest possible speed, and for the shortest time possible, until smooth;
d) Folding in the beaten egg whites into the batter very carefully just before the batter is put in the pan for baking;
e) Placing the batter in the pan(s) for baking;
f) Baking the product in an oven at the temperature and condition required by the recipe.

Thus any established baking recipe can be used as desired to produce the baked item.

In baking cookies, the following applies when using the Wonderslim compound:

a) The quantity of Wonderslim should be half of the quantity of fat usually required by the recipe. More Wonderslim would make the cookies too soft.
b) Do not use egg whites or egg yolks. Wonderslim performs the required function for cookies.
c) Use baking soda in the quantity required by the original recipe, but do not use baking powder.
d) Use All Purpose Flour where possible.

The recommended method of preparing baked cookies or brownies using the Wonderslim compound, comprises the steps of:
a) Mixing a batter comprising the recipe ingredients (except fat, shortening or eggs), and including baking soda and flour but no baking powder;
b) Mixing in said Wonderslim compound into said batter, using a quantity of Wonderslim compound equal or less than one half of the recipe fat requirement;
c) Placing said batter in pans or forms for baking; and
d) Baking the product in an oven at the temperature and condition required by the recipe.

In baking muffins or breads, the same rules and preparation method above applies as for the cookies, except that one egg white is used for each egg required in the usual recipe. Note that no egg whites are used in preparing cookies or brownies.

Finally, it should be appreciated that while the Wonderslim compound described herein does not work exactly like butter, oil, margarine or shortening, its use can all but eliminate fat in the baked product. Experience has shown that its use also extends the shelf life of the product, while maintaining good qualities of taste and texture. The objectives of this patent are then seen to be achieved.

The foregoing description presents the preferred embodiment of a fat substitute compound for use in baking, and also the best known method of its use. It is understood that minor changes and modifications to the compound and the process method may be apparent to those skilled in the art. These changes and modifications are considered to be within the scope and spirit of this invention.

What is claimed is:

1. A process of producing a fat-substitute baking compound, wherein dried plums are used, wherein the process comprises:
   Boiling 78.5% by weight of water;
   Mixing in said water, 19.31% by weight of dried and grated plums to form a slurry;
   Mixing in said slurry, 2.15% by weight of vegetable mono and diglycerides;
   Mixing in said slurry, 0.01% by weight of citric acid; and then
   Cooling said slurry;
   wherein said slurry provides a fat-substitute baking compound for use in the preparation of baked goods.

2. A process of producing a fat-substitute baking compound, wherein dried plums are used, wherein the process comprises:
   Boiling 78.5% by weight of water;
   Mixing in said water, 19.31% by weight of dried and grated plums to form a slurry;
   Mixing in said slurry, 2.15% by weight of lecithin;
   Mixing in said slurry, 0.01% by weight of citric acid; and then
   Cooling said slurry;
   wherein said slurry provides a fat-substitute baking compound for use in the preparation of baked goods.

3. A method for using the invention fat-substitute baking compound as defined in claims 1 or 2 in the preparation of baked cakes, comprising the steps of:
   a) Beating egg whites, with a quarter teaspoon cream of tartar for each 3 egg whites until very firm; adding sugar to the egg whites in small portions at a time and beating until very firm, and then putting them aside;
   b) Mixing the liquid elements of the batter, including said fat substitute baking compound as defined in claims 1 or 2, at high velocity;
   c) Mixing the liquid into the solid elements of the batter at low speed until smooth;
   d) Folding in said beaten egg whites into the batter just before the batter is put in the pan for baking;
   e) Placing said batter in the pan(s) for baking; and
   f) Baking the product in an oven.

4. A method for using the invention fat-substitute baking compound as defined in claims 1 or 2 in the preparation of baked cookies and brownies; comprising the steps of:
   a) Mixing a batter except fat, shortening or eggs, and including baking soda and flour but no baking powder;
   b) Folding in said fat-substitute baking compound as defined in claims 1 or 2 into said batter;
   c) Placing said batter in pans or forms for baking; and
   d) Baking the product in an oven.

5. The method of claim 4, except when preparing muffins,
   Step a) is as follows:
   a) Mixing a batter except fat or shortening, and including flour, an equal quantity of baking powder and baking soda, and one egg white in place of each egg required;

6. The method of claim 4, except when preparing breads,
   Step a) is as follows:
   a) Mixing a batter except fat or shortening, and including baking soda and flour but no baking powder; including also in the batter one egg white in place of each egg required.

* * * * *